United States Patent [19]

Whitman

[11] 4,395,305

[45] Jul. 26, 1983

[54] CHEMICAL ETCHING OF ALUMINUM CAPACITOR FOIL

[75] Inventor: Alfred Whitman, Williamstown, Mass.

[73] Assignee: Sprague Electric Company, North Adams, Mass.

[21] Appl. No.: 410,271

[22] Filed: Aug. 23, 1982

[51] Int. Cl.³ .............................................. C23F 1/00
[52] U.S. Cl. .................................... 156/665; 252/79.2
[58] Field of Search ..................... 156/665; 252/79.2; 204/129.1, 129.35, 129.75, 129.8

[56] References Cited

U.S. PATENT DOCUMENTS

| | | | |
|---|---|---|---|
| 3,284,326 | 11/1966 | Martin | 204/141 |
| 3,316,164 | 4/1967 | Welch | 204/141 |
| 3,321,389 | 5/1967 | Anderson | 204/141 |
| 3,884,783 | 5/1975 | Austin | 204/129.35 |

Primary Examiner—William A. Powell

[57] ABSTRACT

Aluminum capacitor foil is chemically etched to produce a fine etch structure by passing the foil through an etch bath containing sodium chloride and at least an equal amount of sulfuric acid, preferably 11 to about 22 wt %. Etching is carried out at 90° to 105° C.

6 Claims, 2 Drawing Figures

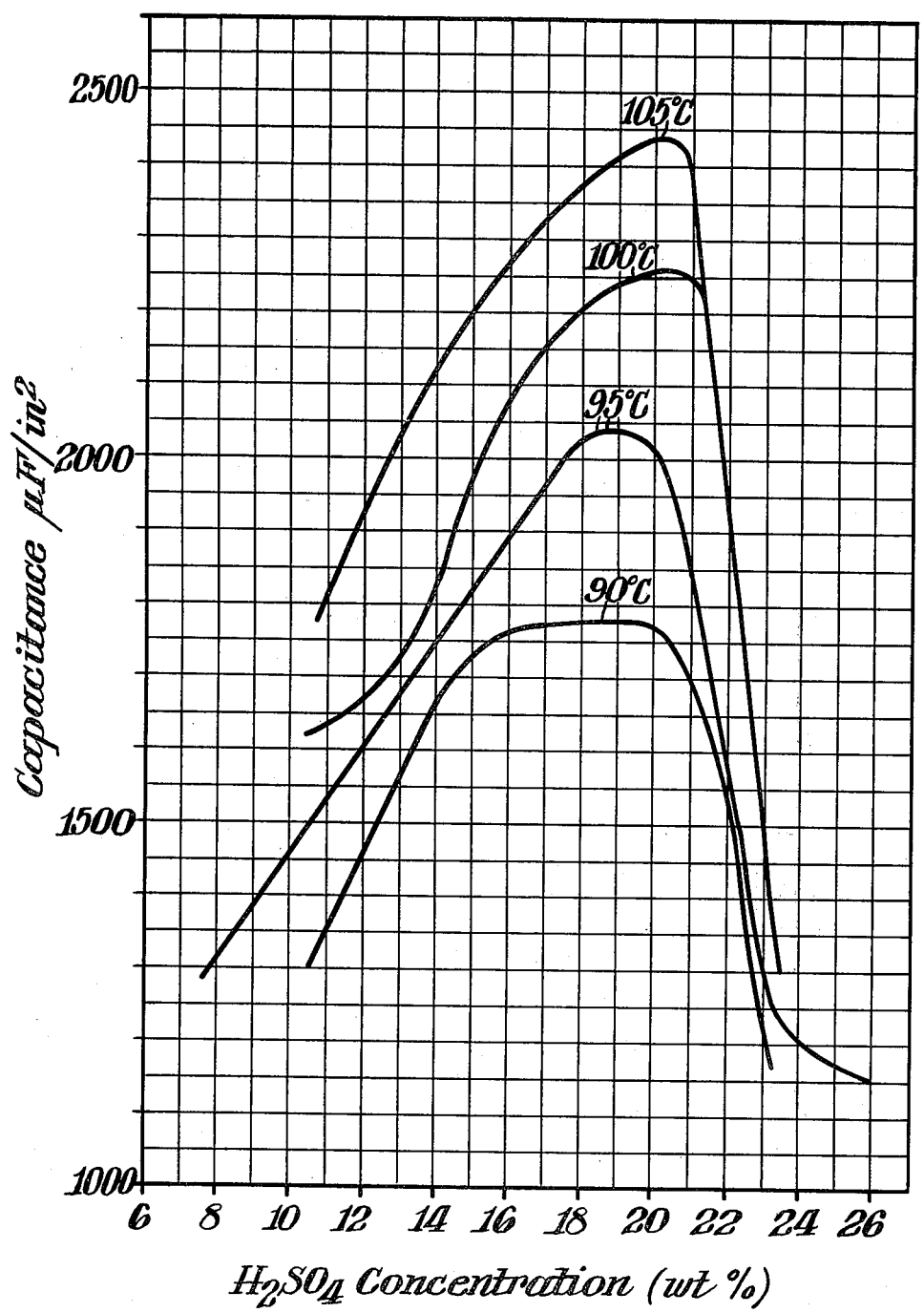

CHEMICAL ETCHING OF ALUMINUM CAPACITOR FOIL

BACKGROUND OF THE INVENTION

This invention relates to the chemical etching of aluminum capacitor foil to produce a fine etch structure using a sodium chloride etchant solution containing at least an equal amount of sulfuric acid, preferably up to 22 wt%. Etching is carried out at 90° to 105° C.

The use of sodium chloride solutions to etch aluminum is well-known. Frequently, the solutions are acidified with strong acids. When such solutions are used to chemically etch aluminum without the use of electricity, a heavy metal compound such as iron, copper or nickel compound is added to catalyst the reaction. However, if traces of these metals remain on the surface or within the pores of the etch structure, these trace amounts can later interfere with the operation of a capacitor made from such foil.

Thus, it is highly desirable to improve the chemical etching of aluminum capacitor foil to produce a fine etch structure without resorting to the addition of heavy metal salts. It is also desirable to obtain the fine etch structure within a reasonable time period and at a reasonable temperature.

SUMMARY OF THE INVENTION

It has been discovered that the addition of at least an equal amount of sulfuric acid, and preferably up to 22 wt%, to a sodium chloride etchant solution produces an etched foil with fine etch tunnels which is particularly suitable for cathode foil.

Technological advances have resulted in the production of capacitor anode foil with high capacitance ratings. In order to take advantage of these high ratings, the surface area of the cathode foil must be increased and thus its capacitance improved also. The present process results in a foil with a very fine tunnel etch structure and hence increased surface area and improved capacitance. It is particularly suitable for cathode foil; while it can be used to produce low voltage anode foil, the fine tunnel structure is readily plugged by anodic oxide and the benefits of these fine tunnels, e.g. increased capacitance, are lost. However, there is a need for high surface area, high capacitance cathode foil to be used with the high capacitance anode foils currently available which have a more open, wider etch structure. The present process also permits a wide choice of operating conditions as it is operable over a broad range of temperature and concentration.

In order to prevent a rapid change in etchant bath composition during start-up operations and as a result, a variation in etched foil quality, aluminum ions which are produced by the process are added to the bath initially in the form of aluminum sulfate. Aluminum concentration is maintained by removing aluminum ions produced by etching as sulfate from the recycle stream by cooling and filtering. Any make-up sulfuric acid and sodium chloride needed to maintain their concentration in the etchant at the above levels is added to the recycle stream before recirculation to the etch tank.

BRIEF DESCRIPTION OF THE DRAWING

FIG. 2 is a series of curves showing capacitance as a function of sulfuric acid concentration and temperature.

DESCRIPTION OF THE PREFERRED EMBODIMENTS

Figure 1:
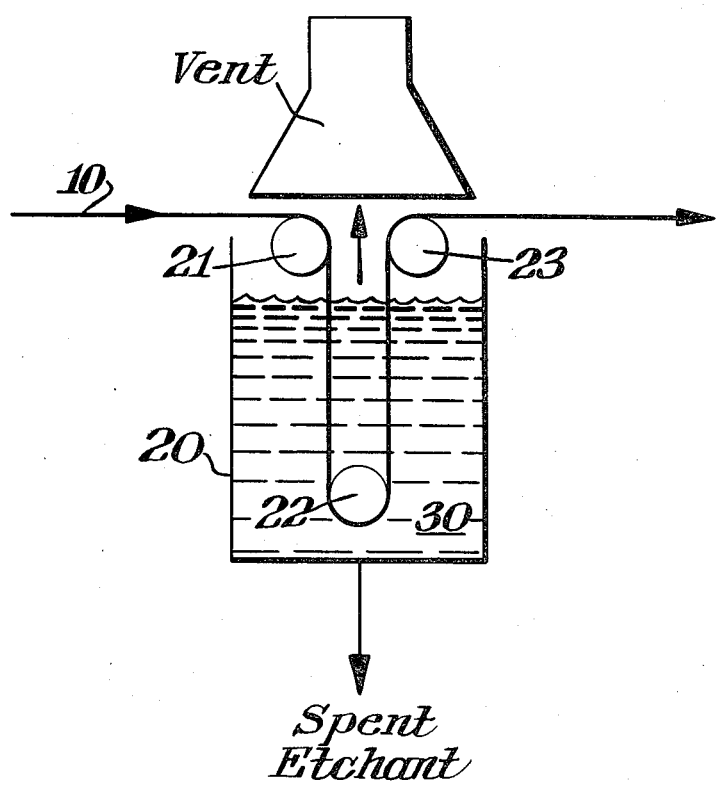
FIG. 1 shows a view of the etch tank used in the present invention.

Aluminum foil 10 is passed into tank 20 over roller 21 and into the sodium chloride etchant 30 containing at least an equal amount of sulfuric acid, and preferably up to 22 wt%, and aluminum sulfate. The etchant solution is maintained at a temperature of 90° to 105° C. Foil 10 passes beneath roller 22 and up over roller 23 and out of tank 20 to customary rinse tanks (not shown) and subsequent processing.

In order not to reduce the machanical strength of the foil, etching conditions were optimized for about a 20% weight loss for 2 mil foil of 99.45% purity. This weight loss is not an absolute figure as losses up to about 30% can sometimes be tolerated without weakening the foil too much for subsequent handling and processing. The 20% level is a balance of sufficient foil strength for subsequent processing and very acceptable capacitance values.

These investigations at a 20% weight loss showed that increasing the sulfuric acid concentration up to about 20 wt% sulfuric acid resulted in higher capacitance at any weight loss; however, above a 20–22 wt% sulfuric acid concentration, capacitance fell off quickly. Increasing the temperature also results in higher capacitance at any given weight loss, and at a 20% weight loss, each 5° C. increase in temperature, particularly in the 90° to 105° C. range, raises capacitance by about 225 μF/in². For each temperature and etchant composition, etching time for a 20% weight loss was determinated, and foil residence time in the bath was set to correspond to such weight loss.

Referring now to FIG. 2, capacitance in μF/in² of foil is plotted against sulfuric acid concentration in weight percent at various temperatures using an etchant also containing 11 wt% sodium chloride and 14 wt% aluminum sulfate.

At 90° C., capacitance rose sharply between 11 and 14 wt% sulfuric acid and increased at a more gradual rate to 17 wt% acid. Capacitance remained fairly constant to 20 wt% acid and then dropped off abruptly.

At 95° C., the results are similar except that all capacitance values are higher and the peak is narrower and more apparent. Highest values were obtained at around 19 wt% acid.

The 100° C. and 105° C. curves are much less symmetrical; while the capacitance still rises sharply up to about 20–21 wt% acid, capacitance drops off precipitously beyond this point.

In another series of experiments, the concentrations of sodium chloride and aluminum sulfate were varied. At 17 wt% aluminum sulfate, the solutions contained at least a slight precipitate unless low levels (8% or less) of sodium chloride were used. The aluminum sulfate concentration was set at 14 wt% to prevent precipitation while permitting a desirable recycle rate, and the best results were then obtained using 11 wt% sodium chloride and 20 wt% sulfuric acid.

Capacitance increase was found to be the result of the presence of sulfuric acid rather than sulfate ion by replacing sulfuric acid by sufficient sodium sulfate to give the same sulfate ion concentration, etching samples, and comparing capacitance. For example, a mixture of 5.15 wt% sodium sulfate and 14.1 wt% sulfuric acid provides a sulfate concentration equivalent to 17.6 wt% sulfuric acid. Instead of a capacitance of 1770 $\mu F/in^2$ as shown in the 90° C. curve of FIG. 2 for an etchant containing 17.6 wt% sulfuric acid, the capacitance obtained using for the sulfate-sulfuric acid mixture was 1640 $\mu F/in^2$.

The process produces foil with a fine tunnel etch structure and hence is particularly suitable for cathode foil. It produces foil with increased capacitance as compared with foil etched by chemical etchants containing lower levels of sulfuric acid.

What is claimed is:

1. A process for the chemical etching of aluminum capacitor foil to produce a fine tunnel etch structure comprising passing said foil through an aqueous etchant bath containing sodium chloride and sulfuric acid, the weight percentage of said sulfuric acid being at least equal to the weight percentage of said sodium chloride.

2. A process according to claim 1 wherein said etching is carried out at a temperature of 90° C. to 105° C.

3. A process according to claim 2 wherein said temperature is 105° C.

4. A process according to claim 1 wherein said weight percentage of sulfuric acid is 11 to 22 wt%.

5. A process according to claim 4 wherein said etchant bath additionally contains aluminum sulfate.

6. A process according to claim 5 wherein said etchant bath contains 11 wt% sodium chloride, 20 wt% sulfuric acid, and 14 wt% aluminum sulfate.

* * * * *